US011842541B1

(12) United States Patent
Carvalho et al.

(10) Patent No.: US 11,842,541 B1
(45) Date of Patent: Dec. 12, 2023

(54) MULTI-RESOLUTION ATTENTION NETWORK FOR VIDEO ACTION RECOGNITION

(71) Applicant: BRANDED ENTERTAINMENT NETWORK, INC., Sherman Oaks, CA (US)

(72) Inventors: Schubert R. Carvalho, Orem, UT (US); Tyler Folkman, Lehi, UT (US); Richard Ray Butler, Van Nuys, CA (US)

(73) Assignee: BEN GROUP, INC., Sherman Oaks (CA)

( * ) Notice: Subject to any disclaimer, the term of this patent is extended or adjusted under 35 U.S.C. 154(b) by 0 days.

(21) Appl. No.: 17/527,962

(22) Filed: Nov. 16, 2021

Related U.S. Application Data

(60) Provisional application No. 63/114,344, filed on Nov. 16, 2020.

(51) Int. Cl.
*G06K 9/00* (2022.01)
*G06V 20/40* (2022.01)
*G06V 40/20* (2022.01)
*G06N 3/04* (2023.01)

(52) U.S. Cl.
CPC .............. *G06V 20/41* (2022.01); *G06N 3/04* (2013.01); *G06V 20/46* (2022.01); *G06V 40/28* (2022.01)

(58) Field of Classification Search
CPC ........ G06V 20/41; G06V 20/46; G06V 40/28; G06N 3/04
See application file for complete search history.

(56) References Cited

U.S. PATENT DOCUMENTS

| 10,713,493 B1 * | 7/2020 | Huang | ............. G06N 3/08 |
| 2005/0238102 A1 * | 10/2005 | Lee | ............. H04N 5/145 |
| | | | 375/E7.102 |

OTHER PUBLICATIONS

"Deep Learning of Fuzzy Weighted Multi-Resolution Depth Motion Maps with Spatial Feature Fusion for Action Recognition" by Al-Faris et al. (Year: 2019).*
Vaswani, A. et. al., "Attention is all you need," NIPS, 2017, pp. 5998-6008.
Bahdanau, D. et. al., "Neural machine translation by jointly learning to align and translate," arXiv preprint arXiv, 2014, 1409.0473.
(Continued)

*Primary Examiner* — Dhaval V Patel
(74) *Attorney, Agent, or Firm* — SOQUEL GROUP LLC

(57) ABSTRACT

This invention classifies an action that appears in a video clip by receiving a video clip for analysis, applying a convolutional neural network mechanism (CNN) to the frames in the clip to generate a 4D embedding tensor for each frame in the clip, applying a multi-resolution convolutional neural network mechanism (CNN) to each of the frames in the clip to generate a sequence of reduced resolution blocks, computing a kinematic attention weight that estimates the amount of motion in the block, applying the attention weights to the embedding tensors for each frame in a clip, to generate a weighted embedding tensor, or context, that represents all the frames in the clip, at the resolution, combining the contexts across all resolutions to generate a multi-resolution context, performing a 3D pooling to obtain a 1D feature vector and classifying a primary action of the video clip based on the feature vector.

20 Claims, 5 Drawing Sheets

(56) References Cited

OTHER PUBLICATIONS

Wang, F. et. al., "Residual attention network for image classification," CVPR, IEEE Computer Society, 2017, pp. 6450-6458.
He, K. et. al., "Deep residual learning for image recognition," 2015.

* cited by examiner

MULTI-RESOLUTION ATTENTION NETWORK FOR VIDEO ACTION RECOGNITION

TECHNICAL FIELD

Various embodiments generally relate to a method and system for classifying actions in videos using a multi-resolution attention network.

BACKGROUND

Recently, deep end-to-end learning for video-based human action recognition (VHAR) from video clips has received increased attention. Applications have been identified in diverse areas including safety, gaming, and entertainment. However, human action recognition derived from video has serious challenges. For example, building video action recognition architectures involves capturing extended spatiotemporal context across frames, requiring substantial computational resources, which may limit industrial applications' speed and usefulness for action recognition. Having a robust spatial object detection model or a pose model to learn interactions between objects in the scene potentially creates highly domain-specific data, which can be time-consuming and expensive to process, as it requires human workers to identify objects in images manually.

Attention models are appealing because they can remove the need for explicit recurrent models, which are computationally expensive. Moreover, attention mechanisms can be the basis for interpretable deep learning models by visualizing image regions used by the network in both space and time during HAR tasks. Current attention architectures for HAR rely on recurrent models or optical flow features, which may require substantial computing resources for model training (for example, sometimes requiring up to 64 GPUs), a problem generally faced by small companies and universities. Other attention models use hand-crafted solutions, meaning that some of the parameters are pre-defined by experts (skeleton parts, human pose, or bounding boxes). Hand-crafted parameters are cumbersome requiring human labor and domain expertise, which may reduce a solution's scalability to new datasets, a problem generally faced in industrial applications. Spatial attention mechanisms aim to localize objects in the scene automatically, without requiring human intervention or expertise. However prior art attention mechanisms do not consider temporal relations among different frames, which may be challenging to learn long-term temporal relations.

Thus, it is with respect to these considerations and others that the present invention has been made.

SUMMARY OF THE DESCRIPTION

This invention provides a new deep end-to-end learning architecture for classifying, or recognizing, human actions that occur in video clips (VHAR). It introduces an architecture, referred to herein as a Multi-Resolution Attention Network (MRANET), that combines mechanisms provided by 2 D convolutional neural networks (2 D-CNNs), including stream networks, keyframe learning, and multi-resolution analysis in a unified framework.

To achieve high computational performance, MRANET uses two-dimensional (2 D) convolutional neural networks (2 D-CNNs) to construct a multi-resolution (MR) decomposition of a scene. In contrast to prior art methods, this approach does not require bounding boxes or pose modeling to recognize objects and actions within videos. The details of a video frame, or image, at several resolutions commonly characterize distinct physical structures with different sizes (frequencies) and orientations in a MR space.

At the core of MRANET is an attention mechanism that computes a vector of attention weights that are computed recursively, i.e. a weight for a frame at time t is a function of the previous frame at time t-1. In certain embodiments, recurrent attention weights are computed using first order (velocity) and second order (acceleration) finite difference derivatives for a sequence of frames in which an action occurs.

In one embodiment, MRANET classifies an action that appears in a video clip by receiving a video clip for analysis, applying a convolutional neural network mechanism (CNN) to the frames in the clip to generate a 4 D embedding tensor for each frame in the clip, applying a multi-resolution convolutional neural network mechanism (CNN) to each of the frames in the clip to generate a sequence of reduced resolution blocks, computing a kinematic attention weight that estimates the amount of motion in the block, applying the attention weights to the embedding tensors for each frame in a clip, to generate a weighted embedding tensor, or context, that represents all the frames in the clip, at the resolution, combining the contexts across all resolutions to generate a multi-resolution context, performing a 3 D pooling to obtain a 1 D feature vector and classifying a primary action of the video clip based on the feature vector.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

Figure 1:
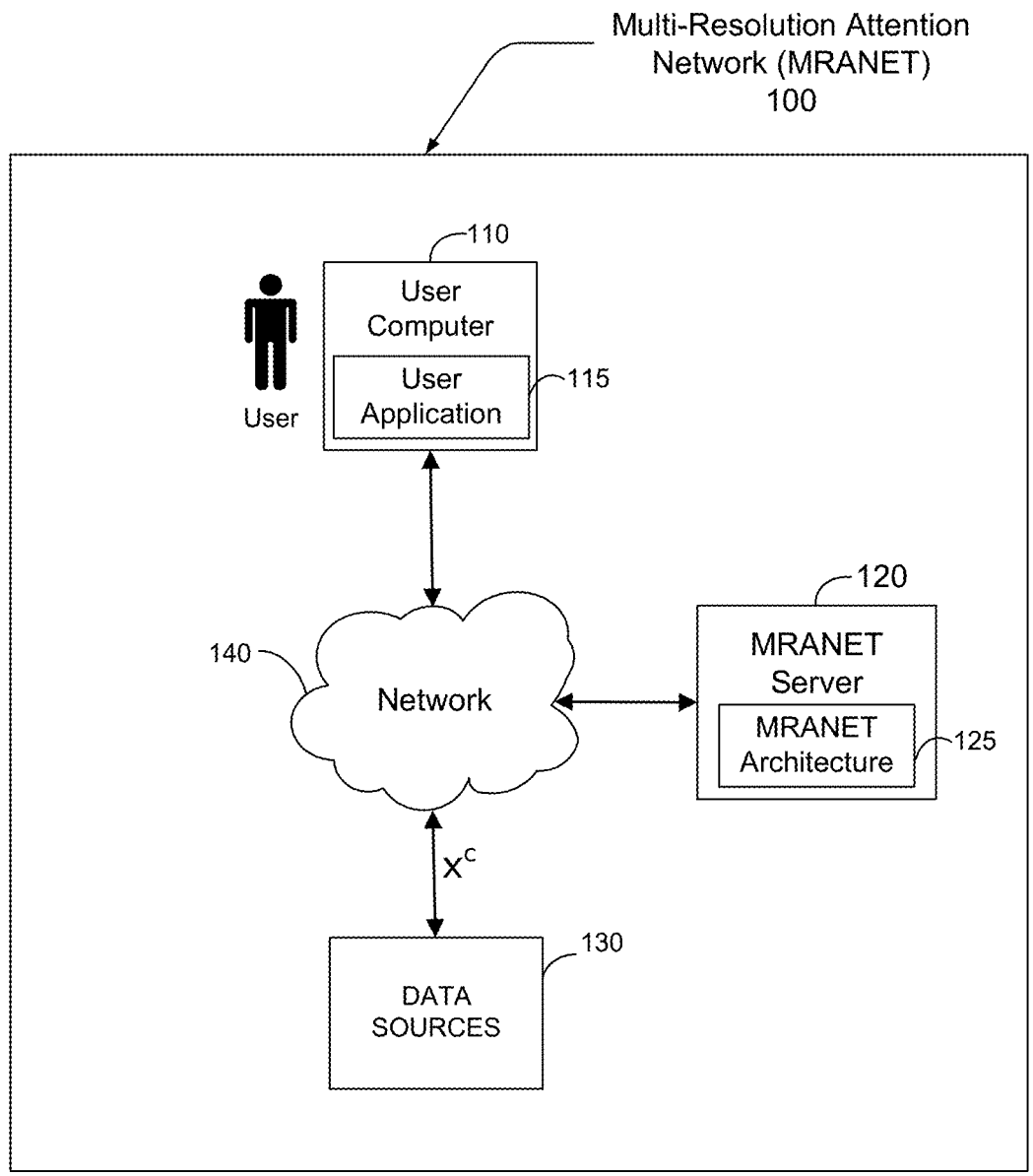
FIG. 1 is a generalized block diagram of a Multi-Resolution Attention Network (MRANET) which analyzes and classifies actions that appear in video clips.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Video clip or clip or video—refers to a segment of video that includes multiple frames. As used herein a video includes a primary action.

Subject—refers to person that performs an action that is captured in a video clip.

Human action or action—refers to a movement within a video clip by a person. While the invention focuses on human actions, the invention is not so limited and can also be applied to animals and inanimate objects such as automobiles, balls, etc.

Pose or human pose—refers to a subject's body within a video frame. A pose may include the entire body or a partial body, for example, just the head.

VHAR—refers to video human action recognition, a fundamental task in computer vision, which aims to recognize or classify human actions based on actions performed in a video.

Machine learning model—refers to an algorithm or collection of algorithms that takes structured and/or unstructured data inputs and generates a prediction or result. The prediction is typically a value or set of values. A machine learning model may itself include one or more component models that interact to yield a result. As used herein, a machine learning model refers to a neural network, including convolutional neural networks or another type of machine learning mechanism, which receives video clips as input data and generates estimates or predictions relative to a known validation data set. Typically, the model is trained through successive executions of the model. Typically, a model is executed successively during a training phase and after is has been successfully trained, is used operationally to evaluate new data and make predictions. It must be emphasized that the training phase may be executed 1000s of times to obtain an acceptable model capable of predicting success metrics. Further, the model may discover 1000s or even 10s of thousands of features. And many of these features may be quite different than the features provided as input data. Thus, the model is not known in advance and the calculations cannot be made through mental effort alone.

Prediction—refers herein to a statistical estimate, or estimated probability, that an action in a video clip belongs to a specific action class or category of actions. A prediction may also refer to an estimate or probability assigned to each class or category within a classification system that includes many individual classes. For example, the Kinetics 400 data set from DeepMind is a commonly used training dataset that provides up to 650,000 video clips, each of which is classified into a set of 400 different human actions or action classes, referred to as an action classification or action classification set.

GENERALIZED OPERATION

The operation of certain aspects of the invention is described below with respect to FIGS. 1-3.

FIG. 1 is a generalized block diagram of a Multi-Resolution Attention Network (MRANET) system 100 which analyzes and classifies actions in video clips. A MRANET server 120 computer operates or executes a MRANET machine learning architecture 125, also referred to as a MRANET 125. MRANET server 120 access data sources 130 which provide video clips, referred to herein as $x^c$, for analysis. The video clips maybe used during training of the model or may be used operationally for analysis and classification. For example, YOUTUBE.COM, a website operated by GOOGLE, INC. may be one of data sources 130. Other data sources 130 may include television channels, movies, and video archives. Typically, MRANET server 120 access video clips from data sources 130 across a network 140.

A user interacts with MRANET server 120 to identify and provide training video clips to train MRANET architecture 125. Typically, a user interacts with a user application 115 executing on user computer 110. User application 115 may be a native application, a web application that runs inside a web browser such as FIREFOX from MOZILLA, or CHROME from GOOGLE INC., or an app that executes in a mobile device such as a smartphone.

User computer 110 may be a laptop computer, a desktop personal computer, a mobile device such as a smartphone or any other computer that runs programs that can interact over network 140 to access MRANET server 120. Generally, user computer 110 may be a smart phone, personal computer, laptop computer, tablet computer, or other computer system with a processor and non-transitory memory for storing program instructions and data, a display and an interaction apparatus such as a keyboard and mouse.

MRANET 125 typically stores data and executes the MRANET method described hereinbelow with reference to FIGS. 2 and 3A-B. MRANET server 120 may be implemented by a single server computer, by multiple server computers acting cooperatively or by a network service, or "cloud" service provided by a cloud service provider. Devices that may operate as MRANET server 120 include, but are not limited to personal computers, desktop computers, multiprocessor systems, microprocessor-based or programmable consumer electronics, network PCs, servers, network appliances, and the like.

Network 140 enables user computer 110 and MRANET server 120 to exchange data and messages. Network 140 may include the Internet in addition to local area networks (LANs), wide area networks (WANs), direct connections, combinations thereof or the like.

Multi-Resolution Attention Network

A supervised, machine learning model provides a score or probability estimate for each class in classification set. The score, or probability, indicates the likelihood that a video clip includes an action as represented by a class member. The class with the highest score may be selected if a single prediction is required. This class is considered to represent an action performed by a subject that most likely occurred in the video clip. A validation dataset of video clips in which the primary class is known for each clip is used to train the model by operating the model successively with different clips from the dataset and adjusting the model with each successive model run to minimize the error.

MRANET is a deep end-to-end multi-resolution attention network architecture for video-based human action recognition (VHAR). FIG. 3 illustrates the overall architecture and processing steps performed by MRANET 100. MRANET 100 performs a per-frame analysis of a video clip to encapsulate a spatial action representation at the first learning step. In certain embodiments, a convolutional neural network (CNN) model or mechanism is used as the embedding model, which processes video frames to extract features. In certain embodiments, a ResNet, or residual network, CNN implementation is used. ResNet has proven effective for image recognition and classification. However, a variety of commercially available CNN models, backbone architectures, or other processing systems that extract image features that can subsequently be used for image classification may be used. In certain embodiments, a ResNet model, pre-trained on the ImageNet dataset, is used as the embedding model (EM). Each of the T frames in a clip is submitted for feature extraction to a CNN 302. Typically, CNN 302 is a commercially available CNN model such as ResNet 18. CNN 302 processes each of the t frames in a video clip, $x^c$, sequentially or in parallel and generates an embedding tensor, et, as output for each frame.

As an example, the last convolutional layer generated by a ResNet CNN, before the average pooling, may be used as the output embedding tensor $e_t$ and then used for further processing. Formally, the EM represents action dynamics of a video clip in a feature volume or 4 D embedding tensor (E), where E is defined in Equation 1, below:

$$E = [e_1, \ldots, e_t, \ldots, e_T] \qquad \text{Equation 1}$$

where E has a shape $E \in R^{T \times g \cdot F \cdot N \times M}$ where T is the number of frames in a clip, F is the number of channels or features in the embedding tensor, and N×M is the cropped image dimension, i.e. spatial size, and g is a scale factor that increases the total number of channels of a ResNet model. Generally, the image dimensions are represented as N×M, i.e. an image of width N and height M. Thus, each of $[e_1, \ldots, e_t, \ldots e_T]$ is a 3D tensor, where the dimensions are a spatial location, specified as a width and height value in a (N×M) frame, and a set of feature values, one value for each of F channels.

The second step of the action representation uses a multi-resolution model (MRM) architecture, described in further detail with reference to FIG. 4, to generate a fine-to-coarse representation of the scene. The details of an image at several resolutions characterize distinct physical structures at different sizes or frequencies and orientations in the MR space. For example, at a coarse resolution ($W^3$ in this example), low-frequencies correspond to large object structures and provide an image "context". Alternatively, the more fine-grained model's resolution layers ($W^0$, $W^1$, $W^2$) learn from small object structures (details). The advantage of the MRM is that it needs neither bounding boxes nor human pose models to detect objects in the scene.

Figure 2:
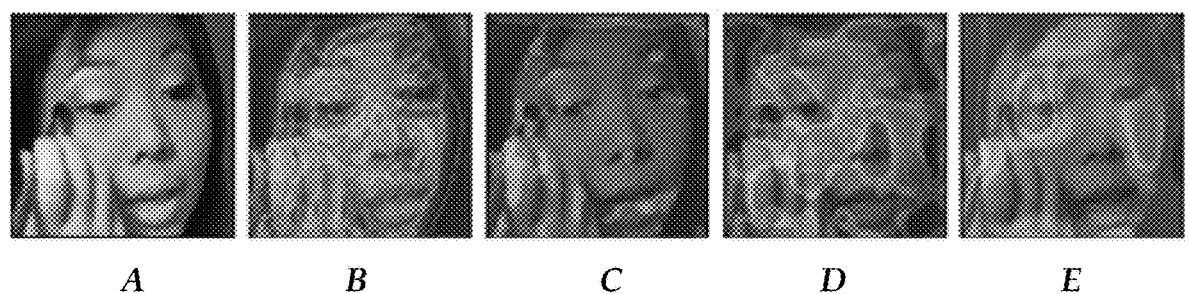
FIG. 2 provides an example of an image and the feature representation at four successively lower resolution versions.
Figure 3:
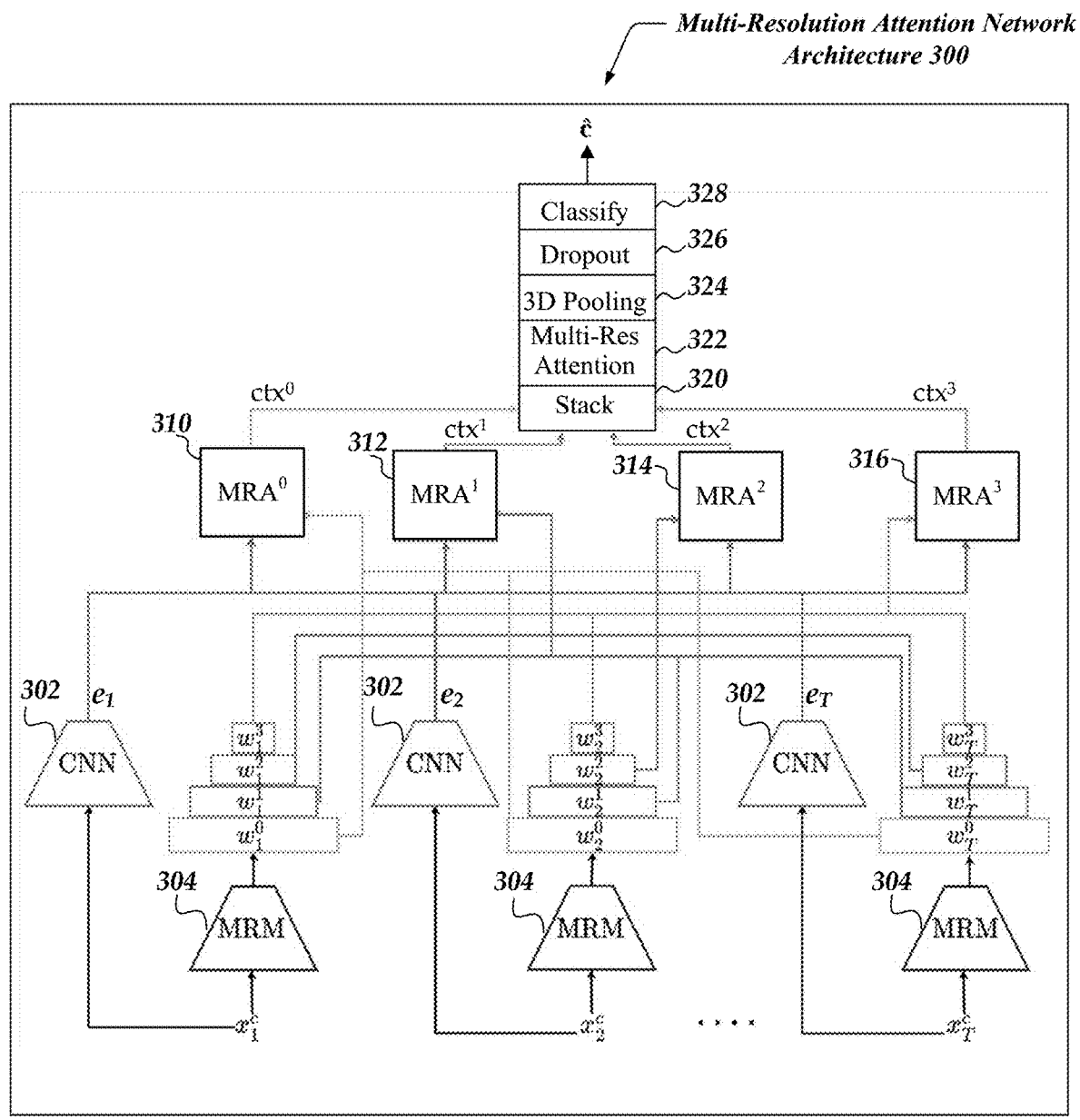
FIG. 3 illustrates the overall architecture and processing steps performed by MRANET.

FIGS. 2 provides an example of an image and its corresponding feature representation at four successively lower resolution versions. Representation A illustrates an initial, input, image. Representation B shows a feature representation, $W^0$, of the image at the highest resolution, i.e., the highest resolution. Representation C shows a feature representation at a half resolution image, $W^1$. Representation D shows a feature representation at a quarter resolution of the initial image, $W^2$. And, Representation E shows a feature representation at one eighth the initial image representation, $W^3$. It may be appreciated that these representations are essentially intermediate layers of a CNN model and the extracted features, illustrated in B-E typically don't correspond to real-world features.

A spatiotemporal attention mechanism, referred to herein as a multi-resolution attention (MRA), computes a vector of kinematic attention weights using kinematic models. The kinematic attention weights add temporal recurrent computations to the attention mechanism, allowing lengthy sequence modeling. It means that a weight computed for an image recorded at time t is computed based on a weight and/or an image recorded at time t-1. The MRA encapsulates each human action in a multi-resolution context. Finally, an action recognition step stacks the contexts and subjects them to a classifier to make a final prediction. Note that the whole model is differentiable, so training it end-to-end is possible using standard backpropagation. One area of novelty is the use of recurrence in a multi-resolution space of attention weights.

Action Parametrizations

Action parameterization models, or identifies, an action performed by a subject within a video clip. Returning to FIG. 3, the model assumes that a raw input video clip is preprocessed to generate a sequence of T video frames, referred to as $x^C = [x_1^c, \ldots, x_t^c, \ldots, x_T^c]$. Each of the clips is provided to CNN 302 and to a multi-resolution module (MRM) 304.

Formally, a video clip may be described by a 4 D tensor $x^c$, as follows:

$$x^c = [x_1^c, \ldots, x_t^c, \ldots, x_T^c], \mu_{x^c} = \frac{1}{T}\sum_{t=1}^{T} x_t^c \qquad \text{Equation 2}$$

where $cx^c \in R^{T \times 3 \times W \times H}$ is a video clip encapsulating the motion dynamics in a scene, T is the number of frames, i.e. the number of 2 D images, in the clip, W refers to the frame width in pixels, or another dimension, and H the frame height, and the value 3 refers to a three value colorspace, such as RGB where there is a red, green, and blue value for each pixel. Additionally, $x_t^c \in R^{3 \times W \times H}$ is the $t^{th}$ frame in the video clip. It is assumed that each frame includes a principal action, c, where c refers to the class of the frame, i.e. how the frame would be classified by a classifier or how it is labeled in a training set, and C is the number of classes. The right side of Equation 2 represents the mean frame ($\mu x^c$). The batch size is omitted to simplify the notation. The result of MRA 300 is an estimate or predicted action class score, referred to as e, also known as logits, an action classification.

Multi-Resolution Models for Spatial Analysis

Referring again to FIG. 3, a multi-resolution model (MRM) 304 implements ResNet models to construct a fine-to-coarse MR representation $\{W^j\}$, $\{j=0, 1, 2, \ldots, S-1\}$ of each frame of $x^c$, where S represents the number of reduced resolution representations, or dimensionality, of the MR space. In essence, Equation 3 recursively computes a per-frame MR decomposition of each clip. So, $W^j$ can be written as:

$$W^j = [W_1^j, \ldots, W_t^j, \ldots, W_T^j], \qquad \text{Equation 3}$$

which is the clip representation in the MR space, where $$W_t^j \in R^{2^j \cdot F \times \frac{N}{2^j} \times \frac{M}{2^j}}.$$

Thus, each $W^j$ is a 3 D tensor that represents an image, while W is a 4 D tensor that represents a clip of T images.

Figure 4:
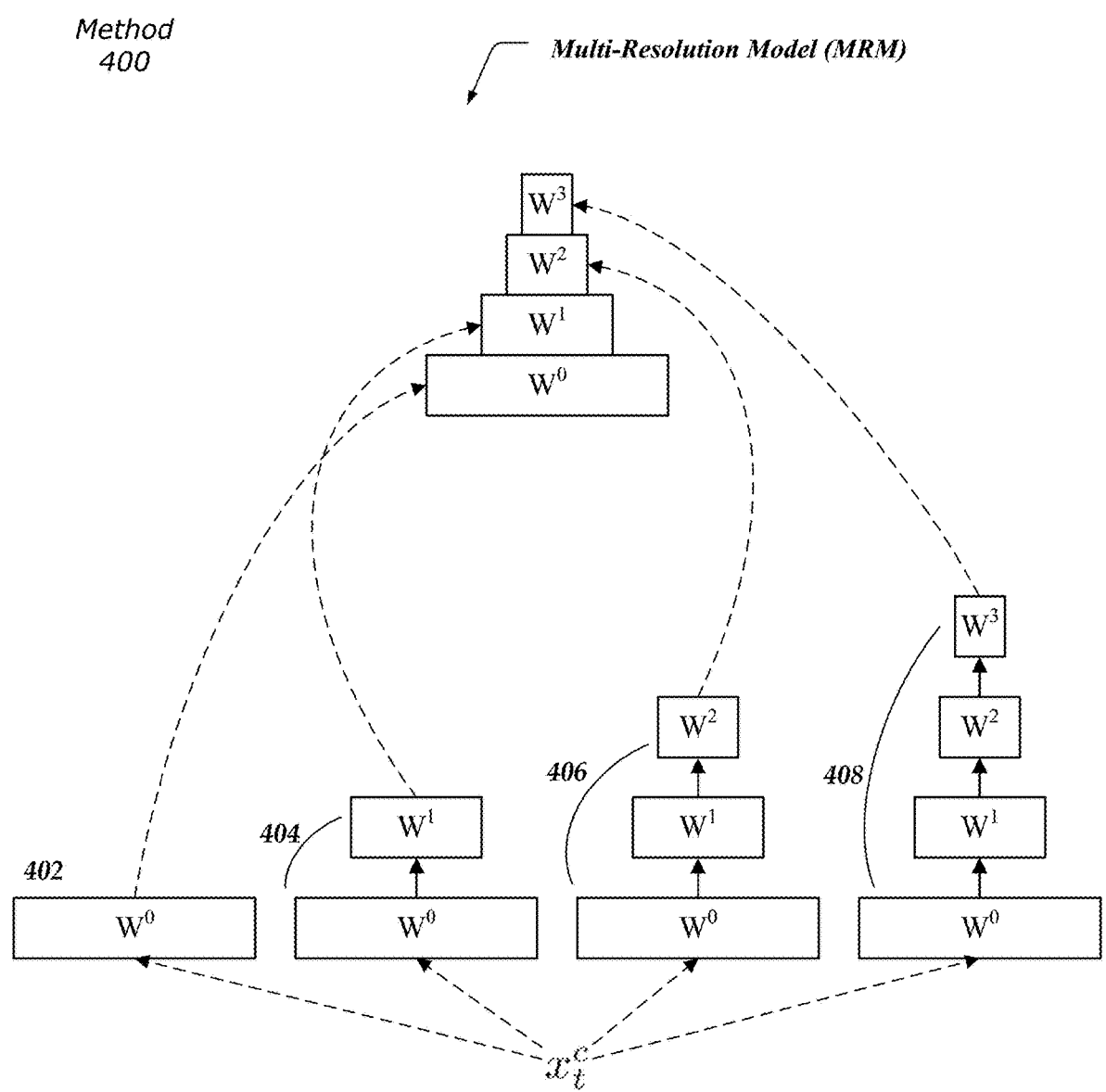
FIG. 4 illustrates the multi-resolution representations, referred to as blocks, generated by MRANET.

FIG. 4 illustrates the multi-resolution representations, referred to as blocks, generated by MRM 304. This is illustrated as four separate models, each typically implemented as a CNN model. Starting with a video frame $x_t^c$ from clip $x^c$, a first model 402 creates a full resolution representation block, $W^0$. A second model 404 generates a half resolution block, $W^1$, based on $W^0$. A third model 406 generates a quarter resolution block, $W^2$, based on $W^1$, $W^0$. A fourth model 408 generates an eighth resolution block, $W^3$, based on $W^2$, $W^1$, $W^0$. While the depiction of MRM 304 processing in FIG. 3 generates four successive reduced resolution blocks, the invention is not so limited, and the MRM model may be adapted to generate any number of reduced resolutions. Further, successive reductions are not limited to being one half the previous resolution. For example, a representation may be ⅓ or ⅛ the resolution of the previous representation.

Table 1, hereinbelow, shows several MRM architectures that have been evaluated. The MR blocks [W0, W1, W2, W3] defined in Table 1 may be generated using a pre-activation ResNet18 model. Nevertheless, there is a difference, the Conv1 layer uses k=(3×3) instead of (7×7), which is the standard kernel used by ResNet models.

In addition to using a ResNet CNN to compute the reduced resolution blocks, other techniques may be used including averaging, interpolation and subsampling.

The output frame size (N×M) is reduced by ½ at each successive resolution, $W^j$. Thus, in the example of Table 1, when $V^0$=112×112, the frame size of the input data $x^c$, the $W^0$ frame size is 56×56, $W^1$ is 28×28, and so forth.

The models' architectures are inspired by the pre-activation ResNet18. Nevertheless, there is one difference, the initial Conv layer (pre-processing input) uses a kernel k=(3×3) instead of k=(7×7). The rest of the architectures' structure is similar to the ResNet18 model, except for the number of channels and blocks. The number of channels and blocks can differ from the original ResNet18 implementation to target performance (fast computations in terms of less multiplication and addition operations) or accuracy. For example, shallow models may be built using the ResNet18 architecture with less channels, thus reducing the amount of multiplication and addition operations.

While the preceding discussion centers around a CNN network architecture for creating MR blocks [$W_0$, $W_1$, $W_2$, $W_3$], a CNN network architecture identical to that use to create W0 may be used to generate the embedding outputs [$e_1$, ... $e_T$], i.e. similar or identical pre-activation and convolution steps may be used.

Temporal Modeling

After the MR processing, the 4 D tensors, W, are subjected to an attention model. As a first step of learning, the attention model computes an vector of attention weights. These attention weights may also be referred to as kinematic attention weights since they reflect motion across the frames in a clip. First, the mechanism performs a high dimensionality reduction from $R^{3D} \Rightarrow R$ using dot-product similarity followed by a 2 D pooling operation. Second, the mechanism performs a normalization (e.g., using a softmax function) to enforce the weights in the range [0, 1]. Finally, the attention model performs a linear or weighted combination between the normalized weights and the model's embedding, E, to compute a context to make a final prediction.

Kinematic Attention Weights

A variety of alternative approaches may be used to compute attention weights that may be applied to the frames of the embedding model outputs, E. Four alternative formulas for computing attention weights are presented hereinbelow: (1) forward velocity, (2) backward velocity, (3) backward acceleration, and (4) absolute position.

Given a motion clip, the temporal dependence of human postures can be modeled by letting a pose at time t+1 be sensitive to the pose in the previous time frame t, using a recurrent computation. To accomplish this, a finite difference derivative, using an estimate of velocity or acceleration, may be used to calculate a kinematic attention weight. An additional model computes positional attention weights where no velocity or acceleration is required. The kinematic attention weights allow the model to learn to look at a pose at time t while tracking poses in previous frames.

Mathematically, a kinematic attention weight at a time t may be estimated from its first order finite derivatives, which may also be referred to as forward and backward velocities, and a second order finite derivative, which may be referred to as backward acceleration, as follows:

$$w'_{t+}{}^j = (w_{t+1}{}^j - w_t{}^j)/\Delta t \qquad \text{Equation 4}$$

$$w'_{t-}{}^j = (w_t{}^j - w_{t-1}{}^j)/\Delta t \qquad \text{Equation 5}$$

$$w''_t{}^j = (w_t{}^j - 2 \cdot w_{t-1}{}^j + w_{t-2}{}^j)/\Delta t^2 \qquad \text{Equation 6}$$

In absolute values, $|w'_{t+}{}^j| = |w'_{t-}{}^j|$, t is the index of the frame within the video clip. It is assumed that the video clip has a fixed grid spacing in the time dimension, i.e. $\Delta t=1$, i.e. ($\Delta t = t+1-t=1$), thus time $t-1$, $t$, and $t+1$ refer to a time sequence of three frames from a clip. Analogously, the second-order derivative is expressed by its forward and central versions. A backward representation of the second-order derivative is used because it is well suited for online computations. Indeed, to predict an action at time t, it uses only past information. Equations 4, 5 and 6 each track a posture or action within a sequence of video frames in relative positions, since a posture at time t is computed relative to postures at previous time steps.

On the other hand, Equation 7, below tracks postures based on absolute position as follows:

$$w'_{t_{cm}}{}^j = (w_{t-1}{}^j - w_{t-1}{}^j) \qquad \text{Equation 7}$$

One potential side effect of first-order approximations is the addition of aliasing (high frequencies), which can be amplified by stride-convolution operations, resulting in degraded accuracy. A well-known solution to anti-aliasing any input signal is low-pass filtering before down-sampling it. This operation can be performed either on the gradient operator or on the stride convolution operations. In one embodiment, low-pass filtering is performed on the gradient operator using the first-order approximation of the central difference derivative. For uniform grids and using a Taylor series, the central derivative can be computed analytically by summing the forward-backward derivatives (Equations 4 and 5), as given in Equation 8, below:

$$w'_{t_{cm}}{}^j = (w_{t-1}{}^j)/2 \qquad \text{Equation 8}$$

While Equations 4, 5 and 8 use information at only two time points, Equation 8 provides quadratic convergence. In practice, Equation 8 gives better accuracy results than the forward or backward differences. It may also be observed that Equation 7 has a non-time dependence characteristic (i.e. it provides no information about the sequence's order); thus, when using Equation 7 the attention mechanism may have difficulty modeling long-range sequences. Accordingly, a reference frame may be added to impose a relative ordering between frames. Instead of using a specific frame, the attention weights are centralized using Equation 9 below:

$$\hat{w}_{t_{pos}}{}^j = w_{t_{pos}}{}^j - \mu_{w_{pos}}{}^j \qquad \text{Equation 9}$$

where $\hat{w}_{t_{pos}}{}^j$ is an alignment model around the mean frame, $$\mu_w^j = \frac{1}{T}\sum_{t=1}^{T} w_t^j.$$

Also, the velocities and acceleration are aligned as well using Equations 10, 11 and 12, below:

$$\hat{w}_{t_+}^j = w_{t_+}^j - \mu_{w_+}^j \quad \text{Equation 10}$$

$$\hat{w}'_{t_{cms}}^j = w'_{t_{cm}}^j - \mu'_{w_{cm}}^j \quad \text{Equation 11}$$

$$\hat{w}''_t^j = w''_t^j - \mu''_w^j \quad \text{Equation 12}$$

where $$\left\{ \hat{w}_t^j, \hat{w}'_{t_+}^j, \hat{w}'_{t_{cm}}^j, \hat{w}''_t^j \in R^{2^j \cdot F \times \frac{N}{2^j} \times \frac{M}{2^j}} \right\}.$$

Note that the tradeoff of features for spatial resolution follows a norm from the ResNet CNN model.

While the decentralized attention weight models presented in Equations 4-7 may yield acceptable results in many cases, the realignment versions of the equations presented in Equations 9-12 have been shown to yield better accuracy. As a realignment consequence, the attention weights will be small for short motion displacements from the mean and larger for longer displacements. In other words, the model automatically learns to use a per-frame strategy to attend to the most informative parts of the clip and to assign a weight for each frame that reflects the variability, or amount, of movement corresponding to the frame.

Thus, again referring to FIG. 3, any of Equations 9-12 may be selected for use to generate the MR decomposition $w^j = [w_1^j, \ldots, w_t^j, \ldots, w_T^j]$, for $j=0, \ldots, S-1$, which are the tensor outputs from MRM 304, also referred to as kinematic tensors. Alternatively, rather than selecting one of the formulas represented by Equations 9-12 they may be combined to generate a tensor output W. For example, the results from each of the equations may be added, averaged, or stacked and passed through a linear CNN layer.

Figure 5:
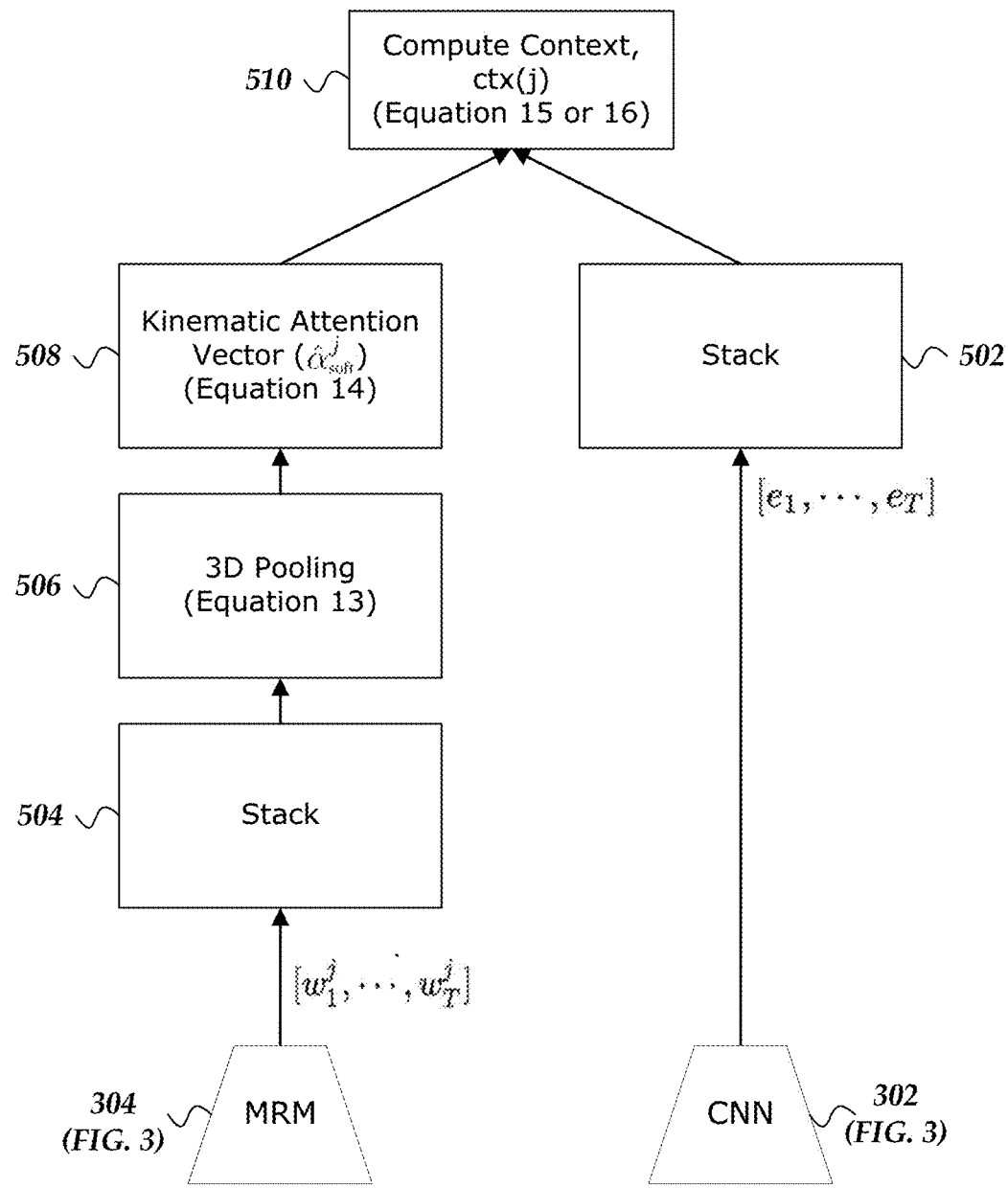
FIG. 5 describes the processing performed by a Multiple-Resolution Attention mechanism to generate a final context, or attention weight for each reduced resolution representation.

FIG. 5 describes the processing performed by MRA 310, 312, 314 and 316 to generate a final context, ctx, or attention weight for each resolution.

At step 504 the kinematic tensors generated by MRM 304 are stacked to create a block. Similarly, at step 502 the embedding outputs of CNN 302, are stacked for later use, as described with respect to step 510 below.

Next, at step 506, a 3 D pooling is used to reduce the kinematic tensors' dimensionality using Equation 13 below:

$$\alpha_t^j = \frac{1}{FNM} \sum_{f=0}^{F-1} \sum_{n=0}^{N-1} \sum_{m=0}^{M-1} \tilde{w}_{t_{f,n,m}}^j \quad \text{Equation 13}$$

$\alpha_t^j$ is the attention weight for a frame at time t and resolution j.

$\tilde{w}_t^j \in \{\hat{w}'w_t^j, \hat{w}_{t_+}^j, \hat{w}'_{t_{cm}}^j, w''_t^j\}$ or $\{w_t^j, w'_{t_+}^j, w'_{t_{cm}}^j, w''_t^j\}$ is the relative or absolute per-frame kinematic tensor, depending on which of the attention weight formulations is being used. The 3 D pooling, or averaging, eliminates, or collapses, the 2 D spatial dimension (N×M) as well as the feature dimension (F).

At step 508, the attention weights, $\alpha_t^j$ are normalized to create a normalized attention vector, $\hat{\alpha}_{t_{soft}}^j$. To accomplish this, the softmax and the vector norm are applied to compute the final kinematic attention weights as:

$$\hat{\alpha}_{t_{soft}}^j = \frac{\exp(\alpha_t^j)}{\sum_{k=0}^{T-1} \exp(\alpha_t^j)}, \hat{\alpha}_{vecn}^j = \frac{|\alpha^j|}{\|\alpha^j\|} \quad \text{Equation 14}$$

where $\hat{\alpha}_{soft}^j \in \Re^T$ is the soft kinematic attention vector and by construction $$\sum_{k=0}^{T-1} \hat{\alpha}_{t_{soft}}^j = 1$$

for each resolution j. |·| represents the absolute value and ||·|| denotes the vector norm operation. $\hat{\alpha}_{veen}^j \in \Re^T$ is a unitary kinematic attention weight vector, which means no energy, or scaling, is added to the model outputs when the attention mechanism computes the action context. Note that positive weights enforce translation invariance for left and right actions with similar displacements. Generally, the soft kinematic attention vector, $\hat{\alpha}_{t_{soft}}^j$, or simply attention vector, provides an attention weight, for each frame t, that specifies a relative contribution or importance of the frame within a clip with T frames at a particular resolution j.

Other dimensionality reduction methods exist and may be used to compute the weights shown in Equation 14. For example, a dot-product similarity $(w\Lambda_t^j)^\vee w_t^{79\ j}$ may be used to remove the filters' dimensionality and to apply a second-order statistics (average pooling) on the (N×M) spatial locations. Another solution is to reduce the tensor's dimensionality $(w^{\Lambda j})$ by applying a succession of linear transformations using fully connected layers and to normalize the weights using the softmax function, which is similar to the dot-product solution.

Soft and Residual Attentions

It is possible to adapt classical deterministic attention mechanisms used by language models to model frame dependencies by computing a linear combination between the attention vector $(\alpha_{t_{soft}}^j)$ and the EM, i.e. the embedding tensors generated by CNN 302, E=[$e_1, \ldots, e_t, \ldots, e_T$], as given below in Equation 15:

$$f_{att}^j \sum_{t=0}^{T-1} \hat{\alpha}_{t_{soft}}^j e_t \quad \text{Equation 15}$$

$f_{att}^j \in R^{g \cdot F \times N \times M}$ is referred to as the soft attention at resolution j. g, as previously discussed, is a scale factor such that if the embedding model (EM) is either ResNet18 or ResNet34, g=1, otherwise g=4. The soft attention encapsulates the video clips action's context at a resolution j. That is, Equation 15 reduces the embedding from T frames to a single frame where the various frames are weighted by the attention weights. Thus, Equation 15 generates a single, weighted, 3 D tensor, with dimensions F×N×M, for each resolution j, in which the attention weights have been applied. The invention isn't limited to using linear combination as the method to apply the attention weights to the embedding tensors; other mathematical formulations may be used.

While the attention weight vector $(\hat{\alpha}_{veen}^j)$ computed above in Equation 14, is unitary, the weights do not always sum to one. A potential drawback appears for small motion displacements from the mean, where $$\sum\nolimits_{t=1}^{T} \hat{\alpha}_{t_{vecn}}^{j} \approx 0,$$

inducing the gradients to vanish. So, the soft attention mechanism of Equation 15 may introduce gradient instabilities during learning. This problem is addressed using residual learning techniques.

A residual attention mechanism is constructed by adding the embedding features in Equation 15. Similarly to the soft attention in Equation 15, the residual attention in Equation 16 first uses a 3 D pooling to reduce the kinematic tensors' dimensionality using Equation 13 and then uses Equation 14 to normalize the attention weights. Mathematically, this is given by $r_{att}^{j}=(\hat{\alpha}_t^j e_t + e_t)$, which is equivalent to $r_{att}^{j}=e_t(1+\hat{\alpha}_t^j)$. Now, if $$\sum\nolimits_{t=1}^{T} \hat{\alpha}_{t_{vecn}}^{j} \approx 0,$$

then $r_{att}^{j}$ will approximate the embedding, e. In other words, if the kinematic attention vector performs an identical mapping, $\Sigma_{t=1}^{T} \hat{\alpha}_{t_{veen}}^{j}=0$, the MRA model performance is no worse than the model without attention, which is equivalent to using only the embedding model (FIG. 3).

The final attention, referred to as Scaled Residual Attention (SRA) is scaled by 1/T, making the context invariant to the clip. SRA is given by:

$$r_{att}^{j} = \frac{1}{T}\sum_{t=0}^{T-1} e_t \cdot \left(1 + \hat{\alpha}_{t_{veen}}^{j}\right), e_l \in R^{g \cdot 2^3 \cdot F \times 7 \times 7} \qquad \text{Equation 16}$$

where each $e_t$ is a 3 D tensor, $e_t \in R^{g \cdot F \cdot N \times M}$

Equations 15 and 16 each compute a single 3 D tensor, of dimension F×N×M, for each resolution j. They are alternative formulations of what is referred to as the context, $ctx^j$. Referring again to FIG. 3, the $ctx^j$ are the outputs of MRA 310, 312, 314, 316.

Multi-Resolution Attention

Returning to FIG. 3, at step 320 the contexts ($ctx^0$, $ctx^1$, ..., $ctx^S$) are stacked with respect to the resolutions. Thus, since there are S resolutions, each being a tensor of dimension FNM, the stacked contexts yield of block of dimension SFNM.

Next, at step 322, a multi-resolution attention is computed, that takes advantage of the fine-to-coarse contexts, $ctx^j$. The final Multi-Resolution Attention (MRA) is computed as:

$$mr_{att} = \frac{1}{S}\sum_{j=0}^{S-1} ctx^j \qquad \text{Equation 17}$$

where $ctx^j$ can be either of $r_{att}^{j}$, computed by Equation 16, or computed by Equation 15. Note that $mr_{att}$ is a 3 D tensor with dimension $R^{g \cdot F \cdot N \times M}$.

MRA is similar to multi-head attention, but two main differences exist. First, instead of concatenating resolutions, the multi-resolutions are stacked and averaged to have smooth features. Second, multi-resolution representations see the scene as different physical structures. This fine-to-coarse representation allows the attention model to automatically learn to focus, first on image details (small objects) at the highest resolution representation and then at each progressively coarser (lower resolution) representation on larger structures that remain across the various scales.

In contrast to prior art attention weight modeling, method 500, which implements MRA 310, 312, 314 and 316, generates attention weights, based on feature representations of the images in a clip at various resolutions. Thus, features which may be apparent at certain resolutions but not others are taken into account when generating a final context.

Then, at step 324 a 3 D pooling operation is performed that averages time and the spatial dimension, i.e. it reduces the N×M×T. This step can be performed using Equation 13. By collapsing the temporal (T) and spatial (N×M) dimension results in a single 1×F feature vector, where the elements are normalized, weighted values or scores for each of the F features.

In certain embodiments a dropout 326 operation is performed on the 1XF feature vector. For example, if there is a relatively small amount of training data in relation to the number of features, such that model overfitting is a consideration, then dropout 326 may be performed. Dropout 326 may be applied each time a model is run during training, for example. Generally, dropout 326 eliminates features in cases where there is insufficient data to generate an estimate. One method for performing drop is described in Srivastava et al., "Dropout: A Simple Way to Prevent Neural Networks From Overfitting", J. of Machine Learning Research 15 (2014).

The final step is referred to as classify 328, i.e. a single class from a set of classes is selected as the primary action of the input video, $x^c$ based on the feature vector. Since the number of classes in the classification set may not be equal to the number of features, a linear transformation is performed at this step which generates a classification vector with scores for each class in the classification set. Since this step is performed using a linear transform is may also be referred to as linearization. Typically, the class with the highest value or score, referred to as ĉ, is the estimate or selected class.

Action Recognition—Model Training

After the multi-resolution attention finishes computation, the MRA network learns to recognize human action from the actions' contexts. As the logits are the vector of raw non-normalized model predictions computed from the model's forward pass as $ĉ=f(\theta,x)$, where $\theta$ represents the neural network parameters (i.e., weights) and $x \in X$, the model is trained by minimizing the negative cross-entropy log-loss. A method such as stochastic gradient descent (SGD) with momentum, referred to as SGDM, is applied, as given below in Equation 18 to iteratively learn the model's weights. Other methods, including adaptive methods such as Adam and RMSProp may also be applied.

$$\theta_{i+1}=\theta_i-\lambda(\beta v_i+\nabla_\theta L(\theta_i)) \qquad \text{Equation 18}$$

Here, $\beta \in [0, 1]$ is the momentum, $\lambda$ is the learning rate and $v_0$ is initialized to 0. One drawback of SGD is the uniform gradient scaling in all directions, posing difficulty tuning learning rates. A novel solution, referred to herein as linear learning rate (LLR) update, is presented below.

LLR initializes the learning rate (e.g., $\lambda=10^{-2}$) and reduces it by a factor of 10 after a number of epochs. In another embodiment, commonly referred to as super-convergence uses cyclical learning rate (CLR) updates, which speeds up training and regularizes the model.

The above specification, examples, and data provide a complete description of the manufacture and use of the composition of the invention. Since many embodiments of

TABLE 1

Alternative MRM Architectures.

| Layer | 6-layer | 10-layer | 18-layer | (N, M) |
|---|---|---|---|---|
| Conv1 | | 3 × 3, 64, stride2 | | 112 × 112 |
| Maxpool | | 3 × 3, stride2 | | 56 × 56 |
| Conv2 | | 3 × 3, 64, stride1 | | 56 × 56 |
| $W^0$ | $[3 \times 3, 64] \times 1$ | $\begin{pmatrix}3\times 3, 64\\3\times 3, 64\end{pmatrix}\times 1$ | $\begin{pmatrix}3\times 3, 64\\3\times 3, 64\end{pmatrix}\times 2$ | 56 × 56 |
| $W^1$ | $[3 \times 3, 128] \times 1$ | $\begin{pmatrix}3\times 3, 128\\3\times 3, 128\end{pmatrix}\times 1$ | $\begin{pmatrix}3\times 3, 128\\3\times 3, 128\end{pmatrix}\times 2$ | 28 × 28 |
| $W^2$ | $[3 \times 3, 256] \times 1$ | $\begin{pmatrix}3\times 3, 256\\3\times 3, 256\end{pmatrix}\times 1$ | $\begin{pmatrix}3\times 3, 256\\3\times 3, 256\end{pmatrix}\times 2$ | 14 × 14 |
| $W^3$ | $[3 \times 3, 512] \times 1$ | $\begin{pmatrix}3\times 3, 512\\3\times 3, 512\end{pmatrix}\times 1$ | $\begin{pmatrix}3\times 3, 512\\3\times 3, 512\end{pmatrix}\times 2$ | 7 × 7 |
| Model Output | | output $\in \{W^0, W^1, W^2, W^3\}$ | | |

What is claimed is:

1. A computer-implemented method for classifying actions that appear in a video clip, comprising:
receiving a video clip for analysis, the video clip comprising a time sequence of video frames;
applying a convolutional neural network mechanism (CNN) to the frames in the clip to generate a 4 D embedding tensor for each frame in the clip, the four dimensions being time, as represented by sequence of video frames within the clip, features, image width and image height;
applying a multi-resolution convolutional neural network mechanism (CNN) to each of the frames in the clip to generate a sequence of reduced resolution kinematic tensors, wherein each kinematic tensor represents a frame at one of the reduced resolutions;
for each reduced resolution, computing a kinematic attention vector, that includes an attention weight for each frame of the video clip, wherein an attention weight for a frame estimates the amount of motion in the frame;
for each resolution, applying the kinematic attention vector to the embedding tensors for each frame in a clip, to generate a weighted embedding tensor, referred to as a context, that represents all the frames in the clip, at the resolution;
combining the contexts across all resolutions to generate a multi-resolution context;
performing a 3 D pooling of the multi-resolution attention to obtain a 1 D feature vector where each value in the feature vector indicates the relative significance of a corresponding feature; and
classifying a primary action of the video clip based on the feature vector.

2. The method of claim 1 wherein classifying the video clip based on the feature vector comprises computing a probability for each action class in an action classification set, wherein an action class probability specifies the likelihood that a corresponding action occurred in the video clip.

3. The method of claim 2 wherein computing a probability for each action class comprises performing a linear transformation between the 1 D feature vector and a 1 D action class vector that represents the action classification set, which results in probability for each class in the action classification set.

4. The method of claim 1 further comprising applying a dropout mechanism to the feature vector that eliminates one or more features.

5. The method of claim 1 wherein each successive reduced resolution embedding tensor is half the resolution of the previous reduced resolution embedding tensor.

6. The method of claim 1 wherein applying a multi-resolution attention mechanism to the reduced resolution kinematic tensors comprises:
computing a tensor for each video frame at each resolution that represents the motion at each spatial location in the video frame; and
performing a 3 D pooling operation that collapses the width, height and feature dimensions, resulting in a scalar attention weight for each frame at each resolution.

7. The method of claim 1 wherein performing a 3 D pooling of the multi-resolution attention comprises averaging the kinematic tensor's in the width, height, and feature dimensions.

8. The method of claim 1 wherein generating a sequence of reduced resolution kinetic tensors comprises:
performing a convolutional neural network operation to generate a new convolutional layer;
reducing the resolution of the new convolutional layer using a technique selected from the group consisting of bilinear interpolation, averaging, weighting, subsampling, or applying a 2 D pooling function.

9. The method of claim 1 wherein computing a kinematic attention weight that estimates the amount of motion in a video frame comprises:
Generating a tensor representation of a video frame at time t using a method selected from the group consisting of a first order finite derivative, a second order finite derivative and an absolute position based on time t; and
centralizing the tensor representation around a mean frame value.

10. The method of claim 1 wherein combining the contexts across all resolutions comprises:
stacking the contexts for each resolution; and
computing a single 3 D tensor that has feature values for each 2 D spatial location.

11. A server computer, comprising:
a processor;
a communication interface in communication with the processor;
a data storage for storing video clips; and
a memory in communication with the processor for storing instructions, which when executed by the processor, cause the server:
to receive a video clip for analysis, the video clip comprising a time sequence of video frames;
to apply a convolutional neural network mechanism (CNN) to the frames in the clip to generate a 4 D embedding tensor for each frame in the clip, the four dimensions being time, as represented by sequence of video frames within the clip, features, image width and image height;
to apply a multi-resolution convolutional neural network mechanism (CNN) to each of the frames in the clip to generate a sequence of reduced resolution kinematic tensors, wherein each kinematic tensor represents a frame at one of the reduced resolutions;

for each reduced resolution, to compute a kinematic attention vector that includes an attention weight for each video frame of the clip, where an attention weight for a frame estimates the amount of motion in corresponding the frame;

for each resolution, to apply the attention vector to the embedding tensors for each frame in a clip, to generate a weighted embedding tensor, referred to as a context, that represents all the frames in the clip, at the resolution;

to combine the contexts across all resolutions to generate a multi-resolution context;

to perform a 3 D pooling of the multi-resolution attention to obtain a 1 D feature vector where each value in the feature vector indicates the relative significance of a corresponding feature; and to classify a primary action of the video clip based on the feature vector.

12. The server computer of claim 11 wherein classifying the video clip based on the feature vector comprises computing a probability for each action class in an action classification set, wherein an action class probability specifies the likelihood that a corresponding action occurred in the video clip.

13. The server computer of claim 12 wherein computing a probability for each action class comprises performing a linear transformation between the 1 D feature vector and a 1 D action class vector that represents the action classification set, which results in probability for each class in the action classification set.

14. The server computer of claim 11 wherein the memory further causes the server:

to apply a dropout mechanism to the feature vector that eliminates one or more features.

15. The server computer of claim 11 wherein each successive reduced resolution embedding tensor is half the resolution of the previous reduced resolution embedding tensor.

16. The server computer of claim 11 wherein applying a multi-resolution attention mechanism to the reduced resolution kinematic tensors comprises:

computing a tensor for each video frame at each resolution that represents the motion at each spatial location in the video frame; and performing a 3 D pooling operation that collapses the width, height and feature dimensions, resulting in a scalar attention weight for each frame at each resolution.

17. The server computer of claim 11 wherein performing a 3 D pooling of the multi-resolution attention comprises averaging the kinematic tensor's in the width, height, and feature dimensions.

18. The server computer of claim 11 wherein generating a sequence of reduced resolution kinetic tensors comprises:

performing a convolutional neural network operation to generate a new convolutional layer;

reducing the resolution of the new convolutional layer using a technique selected from the group consisting of bilinear interpolation, averaging, weighting, subsampling, or applying a 2 D pooling function.

19. The server computer of claim 11 wherein computing a kinematic attention weight that estimates the amount of motion in a video frame comprises:

generating a tensor representation of a video frame at time t using a method selected from the group consisting of a first order finite derivative, a second order finite derivative and an absolute position based on time t; and centralizing the tensor representation around a mean frame value.

20. The server computer of claim 11 wherein combining the contexts across all resolutions comprises:

stacking the contexts for each resolution; and computing a single 3 D tensor that has feature values for each 2 D spatial location.

* * * * *